United States Patent [19]

Jeppesen

[11] Patent Number: 5,364,658
[45] Date of Patent: Nov. 15, 1994

[54] METHOD AND APPARATUS FOR THE COATING OF INDIVIDUAL ITEMS

[75] Inventor: Anders E. H. Jeppesen, Skive, Denmark

[73] Assignee: Bodilsen Holding A/S, Denmark

[21] Appl. No.: 65,020

[22] Filed: May 20, 1993

[30] Foreign Application Priority Data

May 21, 1992 [DK] Denmark ................. 0667/92

[51] Int. Cl.$^5$ .............................................. B05D 1/00
[52] U.S. Cl. .................. 427/209; 427/372.2; 427/424; 427/508; 427/512; 427/521; 118/313; 118/314; 118/501
[58] Field of Search ............... 427/209, 424, 508, 512, 427/521, 372.2; 118/313, 314, 501; 198/471.1, 803.5

[56] References Cited

U.S. PATENT DOCUMENTS

| | | | |
|---|---|---|---|
| 3,961,120 | 6/1976 | Hearn et al. | 427/209 |
| 4,344,380 | 8/1982 | Matsumiya et al. | 427/209 |
| 4,620,826 | 4/1986 | Rubio et al. | 198/803.5 |
| 4,877,645 | 10/1989 | Bleich et al. | 427/117 |
| 5,024,864 | 6/1991 | Bleich et al. | 427/424 |

FOREIGN PATENT DOCUMENTS

| | | |
|---|---|---|
| 087489A | 2/1989 | Denmark . |
| 3104731 | 7/1983 | Germany . |
| 2201104 | 8/1988 | United Kingdom . |

*Primary Examiner*—Shrive Beck
*Assistant Examiner*—David M. Maiorana
*Attorney, Agent, or Firm*—Ware, Fressola, Van Der Sluys & Adolphson

[57] ABSTRACT

A method for coating individual items each having two plain and parallel sides comprises two process steps, wherein an item is first sprayed with a coating when it passes a spray box, and wherein the coating is then hardened, with at least two mutually adjoining sides of the item being treated in both steps. The method comprises two stages, each of which comprises both process steps, and where the item in the first stage at least in the second step is supported on a side which is not treated, after which the remaining sides on the item are treated in the second stage where the item is supported on a side which was treated in the first stage. The items at least in the second step in one of the stages are supported on the one parallel side by vacuum between the item and a conveyor belt. The contact between the item and the conveyor belt is initiated by air jets directed towards the conveyor belt. An apparatus is also proposed for carrying out the above method.

15 Claims, 5 Drawing Sheets

METHOD AND APPARATUS FOR THE COATING OF INDIVIDUAL ITEMS

BACKGROUND OF THE INVENTION

1. Technical field

The invention relates to a method for the coating of individual items, where each item has two substantially plane and mutually parallel sides, and comprising two process steps where in a first step the item is sprayed with coating when it passes a spray box, followed by the second step where the coating is hardened, and where at least two mutually adjoining sides of the item are treated in both steps.

The invention also relates to an apparatus for use in the coating of individual items, where each item has two substantially plane and mutually parallel sides, said apparatus having a spray box with an entry end and an exit end for the items, and with spraying means for the application of coating on at least two mutually adjoining sides of an item. The term "coating" also includes varnish, paints, primers. lacquer and the like.

2. State of the Art

A method and an apparatus as disclosed above, hereinafter called the vacuum technique is known, and the varnishing or lacquering is effected by leading the items or work pieces transversely through a closed container with recirculation of the surplus coating. Around the entry the exit ends there are seals which ensure that coating does not escape to the surroundings, which is of special significance when processing with toxic coatings which harden in ultraviolet light. The disadvantages of the vacuum principle are that only items having a flat profile and without any form of cavity work, discontinued grooves or decorative milling on one or more sides can be treated. Moreover, the ends of the items cannot be varnished, and minimum lengths of possible items lie in the magnitude of 400–500 mm. This is a considerable disadvantage when processing items of wood for furniture production where there is often need for shorter items.

In another known technique whereby the coating is applied by spraying with a traverse spray where the whole item with the spray gun is placed in a larger box or spray enclosure. In addition to the fact that only 20–25% of the surplus coating can be recovered, the cleaning of the spray area and the inside of the box creates problems, as the cleaning takes a long time and, connection and the use of coating hardened by ultraviolet light, it is detrimental to the health of the personnel who are required to carry out the cleaning of the box.

Finally, it can be mentioned that GB A 2,201,104 describes the application of primers and paint on cement tiles, where the tiles are fed past the spray stations resting on a conveyor. After each spray station, the applied layer of coating is hardened under the influence of infrared light. However, the document deals only with an application on one side of the item, as only the side facing upwards and away from the conveyor can be treated.

SUMMARY OF THE INVENTION

The characteristic feature of the method according to the invention is that it comprises two stages, each of which comprises both process steps, and where the item in the first stage at least in the second step is supported on a side which is not treated, after which the remaining sides on the item are treated in the second stage where the item is supported on a side which was treated in the first stage. The item is at least in the second step in one of the stages supported on the one parallel side by vacuum between the item and a conveyor belt, while contact between the item and the conveyor belt is initiated by air jets directed towards the conveyor belt.

The conveyor belt makes it possible to lift the item by its one plane surface at least in the hardening step of the stage that treats the opposite plane surface. It is thus not necessary to turn the items during the process. With the use of air jets, all mechanical contact with the sides of the item covered with wet coating is avoided.

With the arrangement according to the invention the sides of the item which face in the same or the opposite direction as the transport direction can be treated.

The characteristic feature of the apparatus according to the invention is that it comprises a process line provided with transport means for the items, said transport means being divided into two successive sections, each of which is provided with a spray box, followed in the direction of transport by a hardening zone. Each section is arranged to process substantially complementary surfaces on an item. The transport means in the first section are arranged to support an item on a surface which is not treated in the first section, and the transport means in the second section are arranged to support the item on a surface which is treated in the first section. The transport means in one of the sections comprise a conveyor belt which has indentations in its outer side facing the item, as said indentations are provided with perforations which form a connection to a source of vacuum which is disposed on the inner side of the conveyor belt. A number of compressed-air nozzles at the beginning of the belt, seen in the direction of transport, are placed in such a manner that the item during its passage of the nozzles will be forced by the jets of air from the nozzles in the direction towards the belt.

As an example of complementary surfaces on a rectangular item can be mentioned the foremost end surface, the upper side and the one side edge versus the rearmost end surface, the underside and the second side edge. The item can be pulled firmly, for example by its upper side, against the over-lying conveyor, where a vacuum is formed in the indentations on the side which faces towards the item. Here, the expression "subtantially" means, for example, that the side edges can be partly treated in both stages, as a thin layer of coating is applied in both stages, which together form a layer of full thickness or a little more. Consequently, it is possible to process all six sides on a rectangular item, and discontinued grooves, decorative millings, holes and the like in the item will automatically be coated at the same time. Finally, it is possible with the apparatus according to the invention to coating items with minimum lengths which are substantially smaller than has hitherto been possible with corresponding techniques. By using a spray box which has a clearance which is slightly greater than the cross-section of the item, it is possible to hold the coating-contaminated areas down to a minimum, as an exhaustion and collection of the surplus coating can be effected in the spray box.

With the apparatus of the present invention each spray box is provided with spray guns which have a main spraying direction which forms an acute angle with the transport direction of each item. It is hereby possible to coating several surfaces on an edged item with one spray gun, whereby the number of spray guns can be kept at a minimum, and the apparatus is simplified and made cheaper.

In the preferred embodiments of the method and the apparatus according to the invention it is possible to prevent the rear end of a passing item to dip down into the hollow of the spray box treating the underside of the item.

To provide an effective safeguard against the escape of coating to the surroundings, the apparatus is surrounded by a shell which is substantially airtight in relation to the surroundings, and where the air inside the apparatus can be led towards an air exhaust in the spray boxes. There will thus be formed a static underpressure inside the apparatus under the shell, and floating particles of coating will be conducted towards the air exhaust to a cleaning module, whereby the surplus coating can be reused with greater efficiency than with known techniques.

The invention also relates to the use of the method for the application of coating which is hardened by irradiation or exposure to radiation. These types of coating are particularly difficult to work with, the reason being that they will remain in a liquid state until they are exposed to irradiation, regardless of whether the exposure is to ultraviolet light or infrared light, or irradiation by electrons. At the same time, coating for ultraviolet light is extremely toxic, and by use of the method it is possible to avoid the disadvantages of the known techniques.

Finally, the invention relates to the use of the apparatus according to the invention for the application of coating which is hardened by exposure to radiation of any kind, for example by exposure to ultraviolet light or infrared light, or to electron irradiation. The advantages of the use of the invention are described above.

BRIEF DESCRIPTION OF THE DRAWINGS

A preferred embodiment of the apparatus and the method according to the invention will now be described in more detail with reference to the drawings, where.

DESCRIPTION OF THE PREFERRED EMBODIMENT

Figure 1:
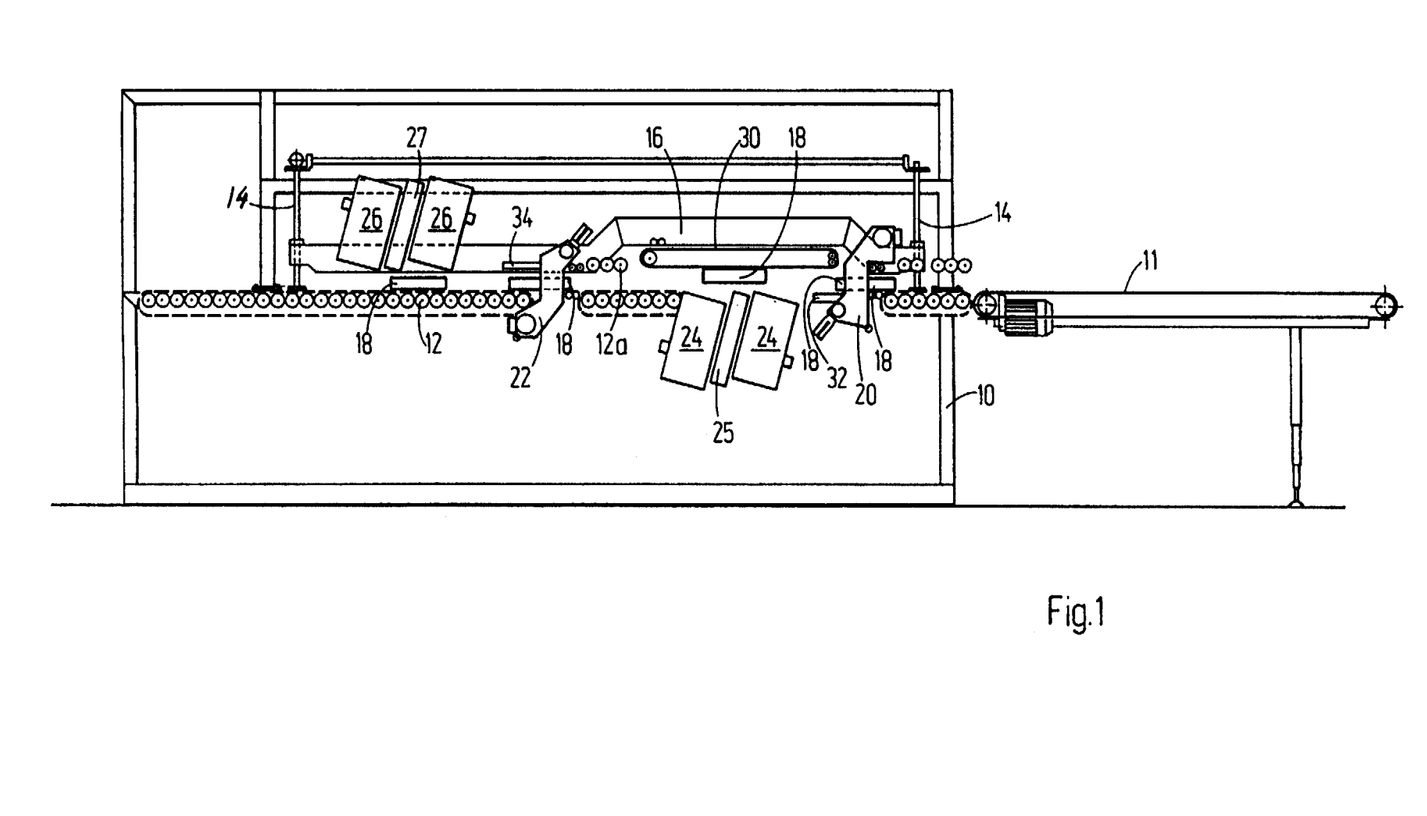
FIG. 1 shows a side view of the apparatus according to the invention.

An apparatus for the application of coating which hardens in ultraviolet light is configured as shown in FIG. 1 in a preferred embodiment, with a frame 10 which supports a roller track 12 and, via parallel worm drives 14, a frame 16. The frame 16 may be adjusted in the vertical direction by simultaneous turning of the worm drives. The apparatus is primarily intended for the coating of wooden work pieces or items 18 for the furniture industry with varnish, but other items of relatively low weight or of low specific density material can be treated.

The roller track 12 forms a path for items 18 through the apparatus, and the individual rollers in the track 12 are connected to a driving mechanism (not shown) so that items 18 may be moved continuously through the path. The feeding of the apparatus is effected by a conveyor 11, which in FIG. 1 runs from right to left. The path extends through a foremost spray box 20 and a rearmost spray box 22. The roller track 12 is divided at the place where the foremost hardening zone with ultraviolet lamps 24 is disposed. Between the lamps 24 there is provided a cooling device 25 for the transport of cooling air to the lamps. A corresponding rearmost hardening zone is provided with lamps 26 and a suction 27. The frame 16 also supports a transport arrangement 30 which is disposed after the foremost spray box 20 and the lamps 24. Immediately after the foremost spray box 20 there are provided compressed-air nozzles, which are formed in slots at the upper side of a box 32, so that the outflow of compressed air will exert an upwards directed force against a passing item 18 to lift it upwardly against the transport arrangement 30. A number of similar compressed-air nozzles provided in the underside of a box 34 are provided immediately after the rearmost spray box 22, these nozzles being directed downwards towards the path.

Figures 2, 3:
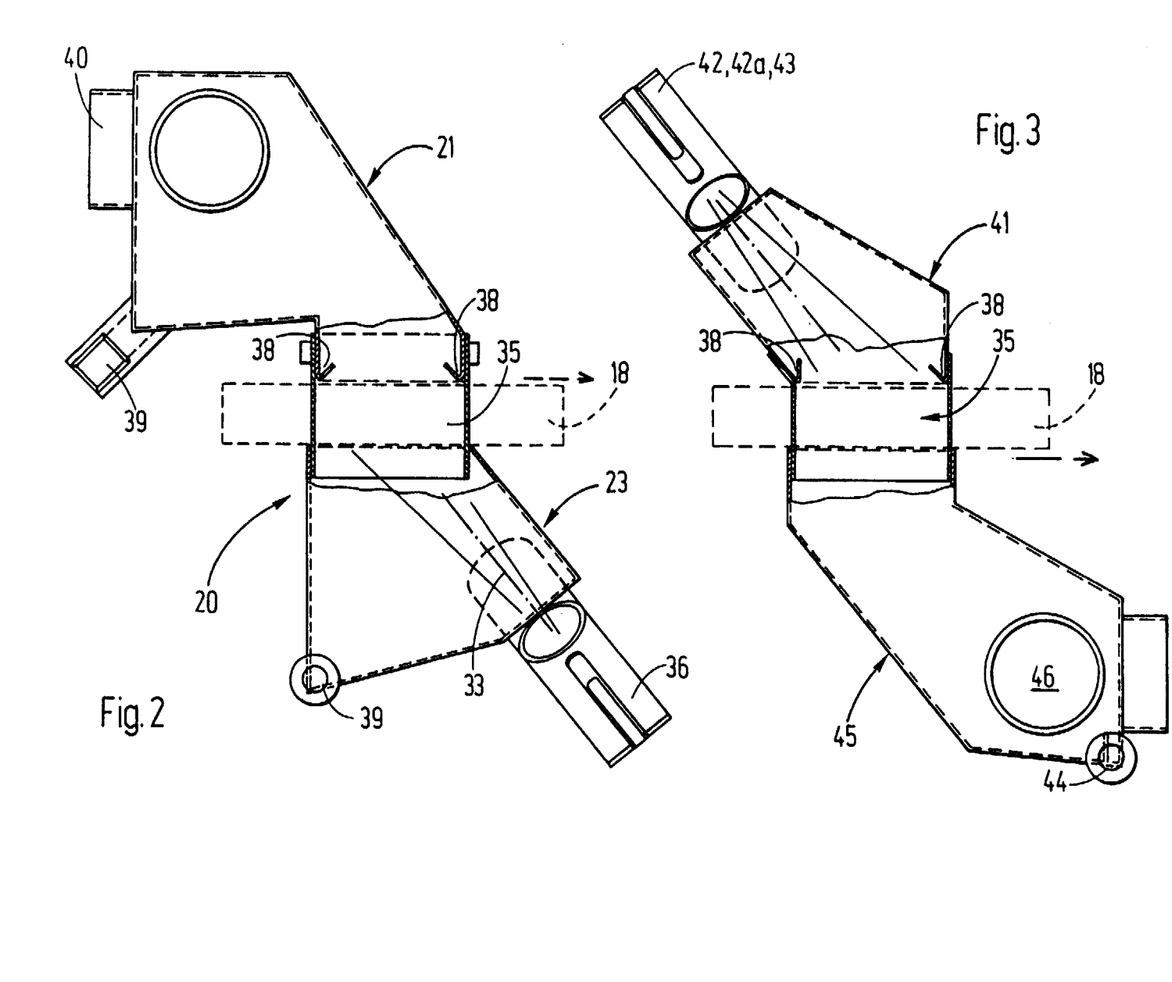
FIG. 2 and 3 show an enlarged side view of the first and second spray boxes respectively, seen in section.
Figure 4:
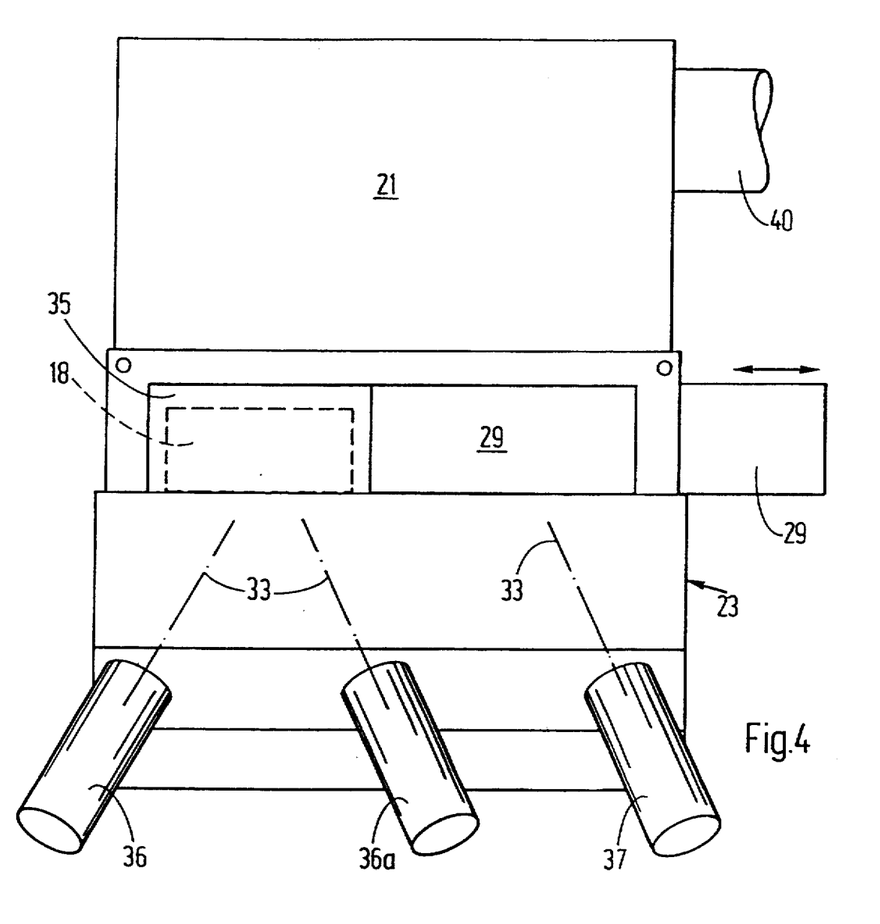
FIG. 4 shows the foremost spray box seen from the one end.

Referring to FIG. 2, the foremost spray box 20 has an upper part 21 which is secured to the frame 16 (FIG. 1), and which is therefore movable in relation to the lower part 23 of the box 20. The part 21 is provided with an opening which has a large clearance 35 so that an item 18 of predetermined maximum size can pass through it. The height of the clearance 35 is defined by the vertical position of the frame 16. Moreover as shown in FIG. 4, there is a slidable baffle plate 29 which may partly cover the opening across its breadth in order to reduce the gap between the clearance 35 and the item 18, when the item 18 is considerably smaller than the maximum breadth of the clearance 35. As shown in FIG. 4, in the bottom of the spray box 20, three spray nozzles 36, 36a and 37 are mounted in such a manner that they all point upwards at an acute angle in the direction towards the transport direction of the items 18. The one outer nozzle 36 and the center nozzle 36a are also directed at an angle inwards towards the center of the left-hand side of the clearance 35 in FIG. 4. The second outer nozzle 37 is directed substantially parallel with the nozzle 36a, but towards another point to the right-hand side of the clearance 35. The upper part 21 of the box is configured as a suction chamber with an exhaust channel 40 and with collection channels 38 for excess coating. In other embodiments, the second outer spray nozzle 37 can be dispensed with if only relatively narrow items 18 are to be sprayed. The angles of the main spraying directions 33 of the nozzles 36, 36a and 37 are such that the foremost end of a passing item, together with the underside and partly the two laterally facing sides, will be coated with the coating sprayed from the nozzles. A drain 39 (FIG. 2) for surplus coating is also provided in the upper part 21 and the lower part 23 of the box.

The rearmost spray box 22 is constructed in a similar manner as the box 20 divided into an upper part 41 and a lower part 45. The upper part 41 is secured to the frame 16 and is thus movable in relation to the lower part 45. In the same manner as described above, there is thus formed a clearance 35 with variable height and breadth. The upper part 41 is provided with three spray nozzles 42, 42a and 43, all of which are directed at an angle downwards towards and in the same direction of movement of the passing items as the nozzles 36, 36a and 37 in the foremost spray box 20. A passing item 18 will thus have its upperside, its rearmost end surface and partly the two longitudinal laterally facing sides coated with coating. The lower part 45 is configured with an exhaust 46 and a drain 44.

Figures 5, 5A:
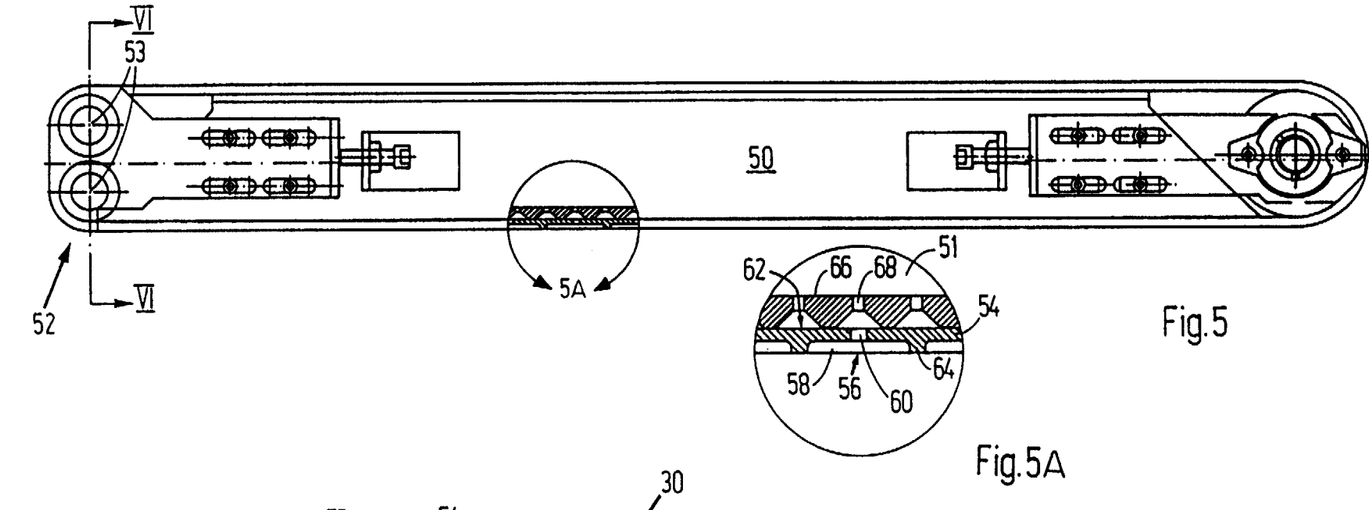
FIG. 5 shows a side view of the conveyor.
Figure 6:
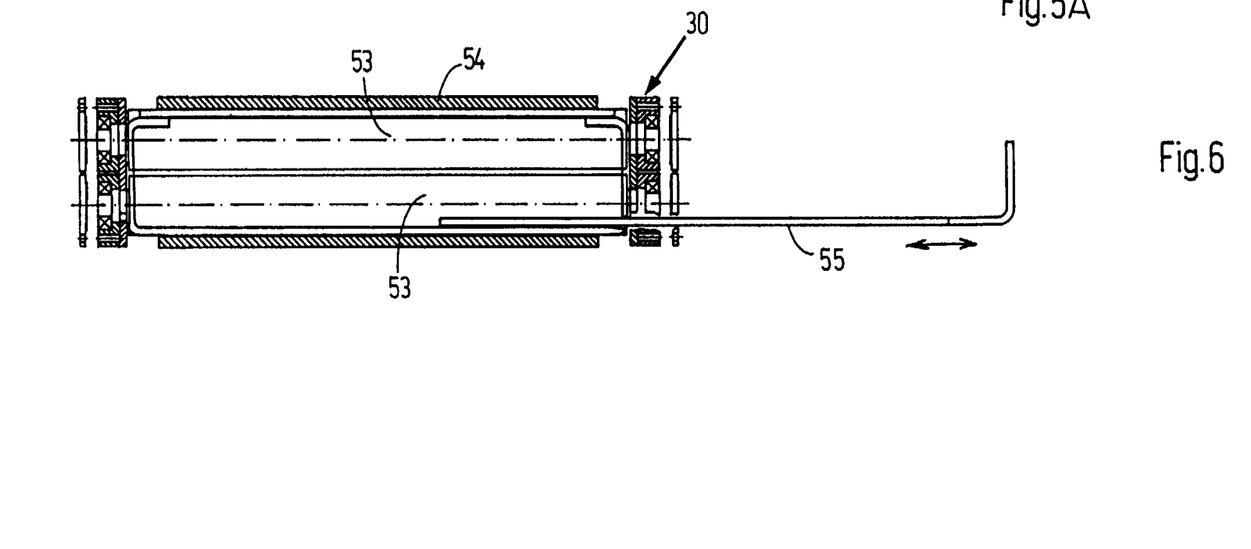
FIG. 6 shows a section along the line VI—VI in FIG. 5.
Figure 7:
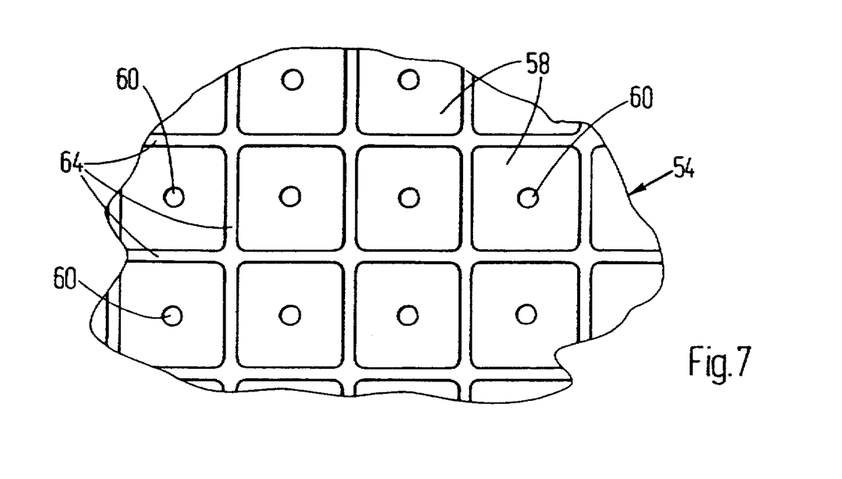
FIG. 7 shows an enlarged detail portion of the surface of the conveyor seen from the outer side.

The transport arrangement 30 comprises an endless conveyor belt 54, and is built up around a central casing 50 in which there is a vacuum chamber 51 connected to a vacuum pump (not shown). FIG. 5 shows the arrangement 30 from the opposite side as seen in FIG. 1. At the foremost end 52, the belt 54 runs around two rollers 53, while at the other end, i.e. the rearmost end of the conveyor, there is only one roller. The two rollers 53 ensure a minimum curvature of the end 52 in order to make an early contact between the belt and the upper side of the item 18, when the item 18 leaves the spray box 20. The actual belt 54 is made of rubber or another elustomeric material. The surface 56 of the belt is provided with indentations 58 in which there are perforations 60 out to the back 62 of the belt 54. The indentations 58 are created by a waffle-formed design of 2-3 mm high ribs 64 on the whole surface 56 of the belt. The back 62 of the belt 54 lies up against a similarly perforated steel plate 66 on the underside of the casing 50, where the perforations consist of slots or holes 68 which extend conically in the direction towards the back 62 of the belt. The holes 68 are connected directly to the vacuum chamber 51 and lie more closely together than the perforations 60 in the belt 54. When the belt 54 slides over the plate 66, the perforations 60 will as a rule be opposite a hole 68, whereby a constant vacuum will exist in the indentations 58 when these are covered by the surface of an item. When the items 18 being transported have a considerably smaller breadth than the belt 54, a baffle plate 55 (FIG. 6) provided in the casing 50 can be slided in the shown directions in such a manner that only holes 68 in a suitable breadth of the belt 54 are left free.

Figure 8:
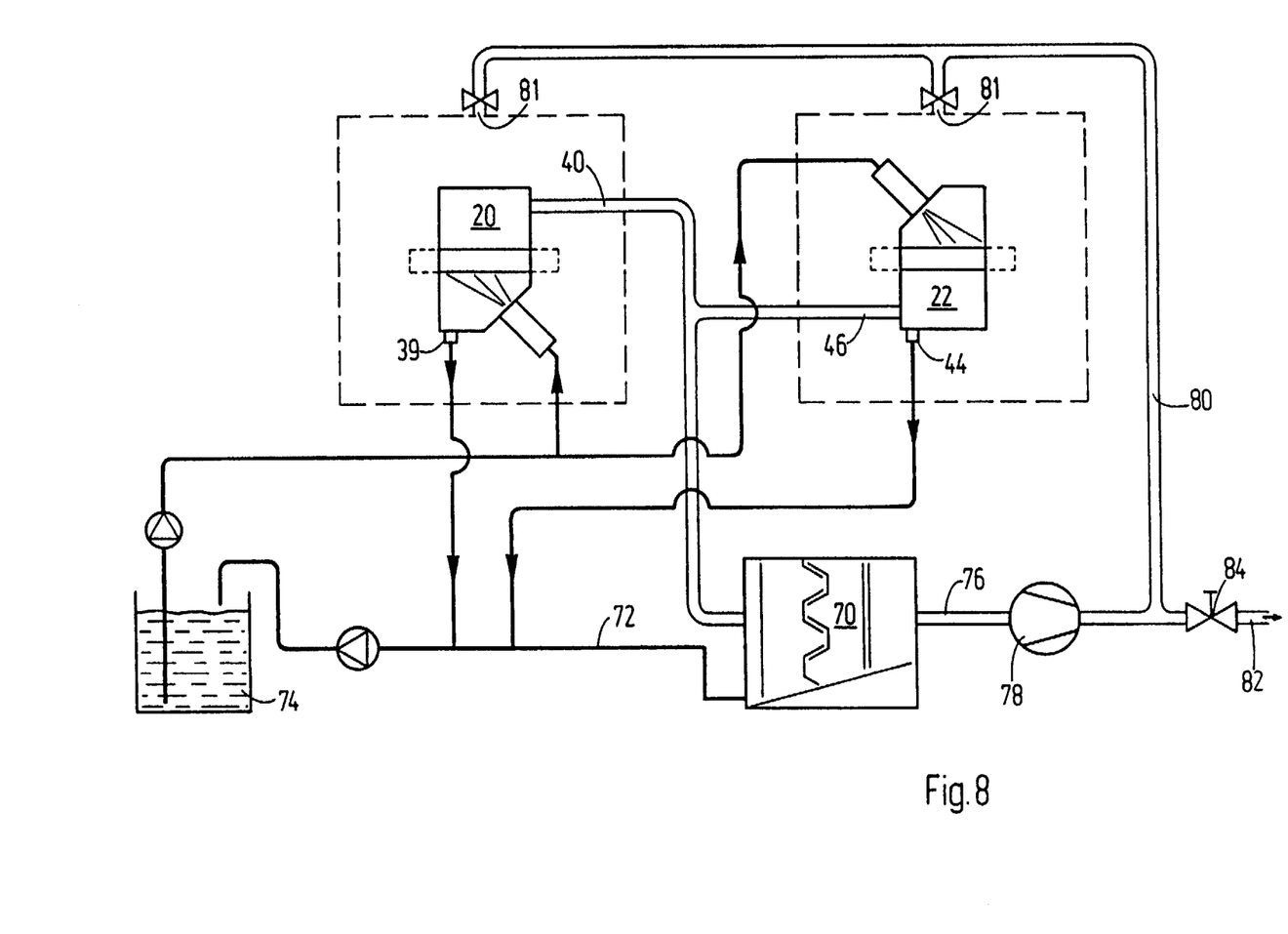
FIG. 8 shows a system diagram for the recirculation of spray liquid.

FIG. 8 shows a system for the collection of unused coating. Air containing particles of coating is exhausted from the spray boxes 20 and 22 via the channels 40 and 46 and is led to a cleaning module 70 where the particles of coating are separated from the air in a known manner by means of a series of baffleplate filters. The collected coating, including that from the drains 39 and 44, is pumped out via a pipe 72 to the coating reservoir 74, from which the coating can be reused. The cleaned air is led further through a pipe 76. The return air is led to the air intake 81 on the spray boxes via a centrifugal ventilator exhaust 78 and via a branch channel 80. Some of the return air, usually 10-15% and regulated by a valve 84, can be led to the surroundings via a second branch channel 82. Unlike the traverse spraying principle, it is possible with this return system to recover by far the larger part of the surplus coating after the spraying, and without the limitations to be found with the vacuum technique.

The method according to the invention can be exercised as follows. An item 18, as seen in FIG. 1 is conveyed on the conveyor 18 to the roller track 12. The item 18, is led through the first stage from right to left on the roller track 12 towards the first spray box 20. Here, the item's foremost end together with the underside are coated with a layer of coating corresponding to a full coverage, and the two side edges are sprayed with an amount of coating corresponding to about 60% of the intended total amount of coating. Immediately after passage of the box 20, the item 18 is pressed upwards by the air jets from the nozzles in the box 32 into contact with the upper surface 56 of the belt 54 of the arrangement 30. It should be noted that the height of the feed path of the arrangement 30 can be adjusted vertically by means of the vertically adjustable frame 16. The effect of the nozzles in the box 32 ensures that the arrangement 30 grips the item 18 by the surface which has not yet been treated. Thereafter, the item 18 is led over the ultraviolet lamps 24, whereby the coating layer on the above-mentioned surfaces of the item 18 hardens. The item 18 is now led further on or above the path of the roller track 12 towards the rearmost end of the arrangement 30 to enter the second stage. As the item 18 reaches the end of the arrangement 30, the item 18 will project in under the overlying roller 12a, which prevents relatively short items from following with the belt 54 or dipping down with their front ends into the opening in the spray box 22. Thereafter, the item 18 passes the rearmost spray box 22, where also here its upperside, its rearmost end are coated with the full amount of coating and the laterally facing sides are coated with a layer of coating of approximately 60% of the desired thickness whereby a slight over-coating of the sides occurs, but this is effected to ensure a sufficient coverage. When the item 18 leaves the box 22, its rearmost end will be inclined to dip down into the underlying hollow of the box 22 particularly, if it has a relatively short leash. This is prevented by the compressed-air nozzles 34 which hold the foremost end of the item 18 pressed down against the roller track Thereafter, the item 18 is led further on the roller track 12 under the rearmost ultraviolet lamps 26 where the uncured coating is hardened.

To the extent that it is possible while taking the transport of the items 18 into consideration, the entire apparatus is enclosed in an airtight casing. That means only the entrance and the exit of the path of the items 18 may allow exchange of ambient air with the air inside the apparatus. Since the air cleaning system leads more air out to the surroundings than it returns to the spray boxes, there will constantly be a slight underpressure inside the apparatus, and thus there will also be a stream of air in the direction towards the spray boxes' openings for the clearances 35, whereby floating particles of coating cannot escape to the surroundings.

The apparatus according to the invention can be combined with processing stations for the items, e.g. for intermediate sanding of the items. Other embodiments of the invention are possible within the scope of the claims, e.g. the conveyor belt may be placed with its outer side extending vertically, thereby carrying the items by their laterally facing sides. In such a case two conveyor belts are necessary for the two process stages.

What I claim is:

1. A method for coating individual workpieces in which the individual workpieces are conveyed in a transport direction comprising the following steps:
    (a) providing a workpiece having first and second substantially planar and mutually parallel sides, each of which adjoins at least one further side of the workpiece;
    (b) supporting the workpiece on the first side;
    (c) applying unhardened coating to the second side and the at least one further side by passing the workpiece through a spray box in the transport direction;

(d) hardening the unhardened coating applied to the second side and the at least one further side; then (e) supporting the workpiece on the second side;

(f) applying unhardened coating to the first side and the at least one further side by passing the workpiece through a spray box in the transport direction; and (g) hardening the unhardened coating applied to the first side and the at least one further side;

wherein at least one of the supporting steps b and e includes supporting the workpiece by creating a vacuum between the workpiece and a conveyor belt as contact between the workpiece and the conveyor belt is initiated by air jets directed toward the conveyor belt.

2. A method according to claim 1, wherein the applying steps c and f include using a spray gun having a main spray direction which forms an acute angle with the transport direction of the workpiece.

3. A method according to claim 1, wherein one of the first and second sides of the workpiece is an upper side and, when the workpiece has passed the spray box for the application of coating to the upper side, the workpiece is forced downwardly by the air jets.

4. A method according to claim 1, wherein each of the hardening steps include hardening the unhardened coating by exposure to radiation.

5. An apparatus for coating individual workpieces in which the individual workpieces are conveyed in a transport direction comprising:

(a) means for providing a workpiece having first and second substantially planar and mutually parallel sides, each of which adjoins at least one further side of the workpiece;

(b) means for supporting the workpiece on the first side;

(c) means for applying unhardened coating to the second side and the at least one further side by passing the workpiece through a spray box in the transport direction;

(d) means for hardening the unhardened coating applied to the second side and the at least one further side; then (e) means for supporting the workpiece on the second side;

(f) means for applying unhardened coating to the first side and the at least one further side by passing the workpiece through a spray box in the transport direction; and (g) means for hardening the unhardened coating applied to the first side and the at least one further side;

wherein at least one of the means for supporting includes means creating a vacuum between the workpiece and a conveyor belt as contact between the workpiece and the conveyor belt is initiated by air jets directed toward the conveyor belt.

6. An apparatus according to claim 5, wherein both of the applying means include a spray gun having a main spray direction which forms an acute angle with the transport direction of the workpiece.

7. An apparatus according to claim 5, wherein each of the hardening means include means to harden the unhardened coating by exposure to radiation.

8. An apparatus according to claim 5, wherein the conveyor belt has indentations in an outer side facing the workpiece, said indentations have perforations forming a connection to a vacuum source disposed on an inner side of the conveyor belt.

9. An apparatus according to claim 8, wherein the vacuum source has a plate-formed part having a surface against the inner side of the conveyor belt and has a number of throughgoing holes which form connection to a cavity connected to a vacuum pump.

10. An apparatus according to claim 5, wherein the air jets are compressed-air nozzles juxtaposed adjacent an exit end of one of the spray boxes.

11. An apparatus according to claim 5, wherein the air jets are provided by a plurality of compressed-air nozzles at a beginning portion of the conveyor belt, as seen in the transport direction, whereby the workpiece as it passes the nozzles will be forced by the air jets from the nozzles in the direction towards the conveyor belt.

12. An apparatus according to claim 5, further comprising the apparatus is surrounded by a shell which is substantially airtight whereby air inside the apparatus can be directed towards an air exhaust in the spray boxes.

13. A method according to claim 1, wherein said first and second substantially planar and mutually parallel sides of the workpiece are first and second substantially planar and mutually parallel major surfaces of the workpiece and the at least one further side of the workpiece is two separate sides which are not parallel to said first and second major surfaces.

14. A method according to claim 1, wherein the workpiece is a rigid workpiece.

15. A method according to claim 3, wherein the workpiece has a foremost end which is forced downwardly by the air jets.

* * * * *

UNITED STATES PATENT AND TRADEMARK OFFICE
CERTIFICATE OF CORRECTION

PATENT NO. : 5,364,658
DATED : November 15, 1994
INVENTOR(S) : Anders Erik Hjorth Jeppesen It is certified that error appears in the above-indentified patent and that said Letters Patent is hereby corrected as shown below:

```
Col. 1, line 22, after "primers", insert --,--;
Col. 1, line 42, after "technique", delete --whereby--;
Col. 1, line 48, after "and,", insert --in--;
Col. 3, line 5, after "invention", insert --,--;
Col. 4, line 13, "suction" should be --cooling device--;
Col. 4, line 33, after "Moreover", insert --,--;
Col. 5, line 21, after "60", insert --opening--;
Col. 6, line 29, "leash" should be --length--;
Col. 6, line 31, after "track", insert --12.--;
Col. 6, line 54, after "case", insert --,--.
```

Signed and Sealed this

Fourteenth Day of March, 1995

Attest:

BRUCE LEHMAN

Attesting Officer

Commissioner of Patents and Trademarks